United States Patent
Margetts

(10) Patent No.: US 9,727,310 B2
(45) Date of Patent: Aug. 8, 2017

(54) ENTROPY SOURCE FOR RANDOM NUMBER GENERATOR

(71) Applicant: OCZ Storage Solutions, Inc., San Jose, CA (US)

(72) Inventor: Julien C. R. Margetts, Thame (GB)

(73) Assignee: Toshiba Corporation, Tokyo (JP)

( * ) Notice: Subject to any disclaimer, the term of this patent is extended or adjusted under 35 U.S.C. 154(b) by 204 days.

(21) Appl. No.: 14/675,457

(22) Filed: Mar. 31, 2015

(65) Prior Publication Data

US 2016/0291936 A1  Oct. 6, 2016

(51) Int. Cl.
*G06F 7/58* (2006.01)

(52) U.S. Cl.
CPC .................. *G06F 7/588* (2013.01)

(58) Field of Classification Search
None
See application file for complete search history.

(56) References Cited

U.S. PATENT DOCUMENTS

| | | |
|---|---|---|
| 3,653,026 A | 3/1972 | Hurley |
| 6,687,721 B1 | 2/2004 | Wells et al. |
| 6,862,605 B2 | 3/2005 | Wilber |
| 8,015,224 B1 | 9/2011 | Chaichanavong et al. |
| 8,489,660 B2 | 7/2013 | Herbert et al. |
| 8,745,114 B2 | 6/2014 | Inglett et al. |
| 2003/0185392 A1* | 10/2003 | Sun .................. G06F 7/588 380/46 |
| 2010/0146025 A1* | 6/2010 | Ergun .................. G06F 7/588 708/251 |
| 2013/0099872 A1* | 4/2013 | Pickett .................. G06F 7/588 331/78 |
| 2014/0195576 A1 | 7/2014 | Kaplan et al. |
| 2015/0301802 A1* | 10/2015 | Katoh .................. G06F 5/01 708/190 |
| 2016/0291936 A1* | 10/2016 | Margetts .................. G06F 7/588 |

* cited by examiner

*Primary Examiner* — David H Malzahn
(74) *Attorney, Agent, or Firm* — White & Case LLP

(57) ABSTRACT

An entropy source extracts noise associated with the sampling of an RC circuit. The decay time of the RC circuit and other parameters are selected so that a buffer used to sample the voltage remains in an indeterminate voltage region over multiple clock cycles to generate random transitions. The entropy source may be implemented to be compliant with government standards for entropy sources utilized to generate random numbers.

25 Claims, 6 Drawing Sheets

ENTROPY SOURCE FOR RANDOM NUMBER GENERATOR

FIELD OF THE INVENTION

The present invention is generally related to entropy sources and applications of entropy sources in random number generators.

BACKGROUND OF THE INVENTION

In the field of information security, there are many applications which use random numbers. The basis of modern cryptography is the use of openly available cryptographic algorithms that utilize secret information (such as cryptographic keys) and random elements (such as salt, nonces and padding data).

The security of modern cryptographic algorithms relies not on the algorithms themselves being secret (rather, they are published and open for public scrutiny and research), but on the properties of the associated keys and random elements, which must be truly random and not predictable in any way.

For example, a symmetric cipher algorithm, such as the Advanced Encryption Standard (AES), is designed such that, without knowledge of the cipher keys, there is no known short cut to decrypting any data encrypted with the symmetric cipher algorithm other than a brute force attack involving trying every possible key combination exhaustively. To fully achieve this objective requires that the keys are truly random, because if the keys are truly random then the key is then equally likely to be any one of the possible combinations.

There are practical difficulties in the generation of true random numbers. Methods to generate true random numbers generally rely on some natural phenomenon that gives rise to random variations. Examples include thermal noise (Johnson-Nyquist noise) in electrical conductors and radioactive decay. The problem with such true random number generators is that they can be cumbersome and the rate of production of random data can be too slow for many applications.

An alternative to a true random number generator is a pseudo-random number generator (PRNG). A PRNG has an output that appears statistically random, but in fact is completely predictable due to the fact that a PRNG employs a deterministic method or algorithm. This means that if the current state of the generator can be determined, it becomes possible to predict future and past states of the generator. There are applications where this property is not important, for example for use in simulations and statistical modeling.

However, in information security applications, it is vital that it should not be possible to predict future values of a PRNG, nor calculate previous values. A PRNG satisfying this requirement is known as a Cryptographically Secure PRNG (CSPRNG). A CSPRNG has the property that it is computationally infeasible to determine the internal state of the CSPRNG even with full knowledge of the outputs.

In order to facilitate the development CSPRNGs and techniques to generate random bits (which can be used directly or converted to random numbers) for application in information security, the US National Institute of Standards and Technology (NIST) have published NIST Special Publication 800-90A, "Recommendation for Random Number Generation using Deterministic Random Bit Generators" published January 2012 by the U.S. Department of Commerce, the contents of which are hereby incorporated by reference. NIST Special Publication 800-90A specifies recommended requirements and algorithms for Deterministic Random Bit Generators (DRBGs) which will function as CSPRNGs. The functional model of the DBRG utilizes a DBRG mechanism and a source of entropy input. A process to construct a seed for instantiation includes as inputs the entropy input, a nonce, and an optional personalization string. The entropy input may be provided by an approved entropy source. The entropy input must have an entropy that is equal to or greater than a security strength of the instantiation. NIST SP 800-90A specifies that an "Approved entropy source" is "an entropy source that has been validated as conforming to SP 800-90B." That is, the approved entropy source is the subject of a separate recommendation, set forth in NIST SP 800-90B, "Recommendation for Entropy Sources for Random Bit Generation," published August 2012 by the U.S. Department of Commerce, the contents of which are hereby incorporated by reference.

NIST SP 800-90B "describes the properties that an entropy source must have to make it suitable for use by cryptographic random bit generators." An entropy source provides a source of random bitstrings." A noise source is the "component of an entropy source that contains the non-deterministic, entropy-producing activity."

The model of an entropy source used by NIST SP800-90B comprises a noise source that contains non-deterministic, entropy producing activity, health testing and (optional) conditioning of the digitized noise source output. The health tests form an integral part of the entropy source and are separated into startup tests, continuous tests and on-demand tests. The end goal of the testing is to gain assurance that failures or erratic/pathological behavior of the entropy source can be detected. In order to do this, a testing strategy needs to determine the likely failure modes for the entropy source, which will of course vary according to the specific type of entropy source (noise source) employed.

No particular noise source is specified for the entropy source in NIST SP 800-90B. The choice of noise source and technique to perform health testing is open to the end designer as long as the other requirements of the recommendation are satisfied.

NIST SP 800-90B is also indirectly related to other standards promoted by NIST. In particular, the cryptographic module standards promoted by NIST, such as FIPS 140-2, implicitly require other NIST approved components. The FIPS PUB 140-2, "Security Requirements for Cryptographic Modules," is published by NIST and requires NIST approved cryptographic functions that would be understand by those in the art to include an entropy source compliant with NIST SP 800-90B.

One of the practical problems with the NIST recommendations is that it is difficult to establish a reliable and inexhaustible source of entropy in a system. There are various problems and drawbacks with applying conventional entropy sources to create an entropy source that is compliant with the NIST recommendations. One problem is guaranteeing that useful entropy can be extracted from the entropy source. Another problem is achieving a long lifetime of the entropy source at a low cost.

SUMMARY OF THE INVENTION

An entropy source extracts noise associated with the sampling of a resistance and capacitor circuit (RC). A buffer circuit used to sample the voltage of the capacitor has a transfer function in which the output of the buffer in indeterminate if the input voltage is within an intermediate range. The decay time of the RC circuit and other parameters are selected so that the buffer used to sample a decaying capacitor voltage remains in an indeterminate voltage region over multiple clock cycles to generate random transitions. A counter may be enabled and disabled by the random transitions. The entropy source may be implemented to be compliant with government standards for entropy sources utilized to generate random numbers.

DETAILED DESCRIPTION

Figure 1:
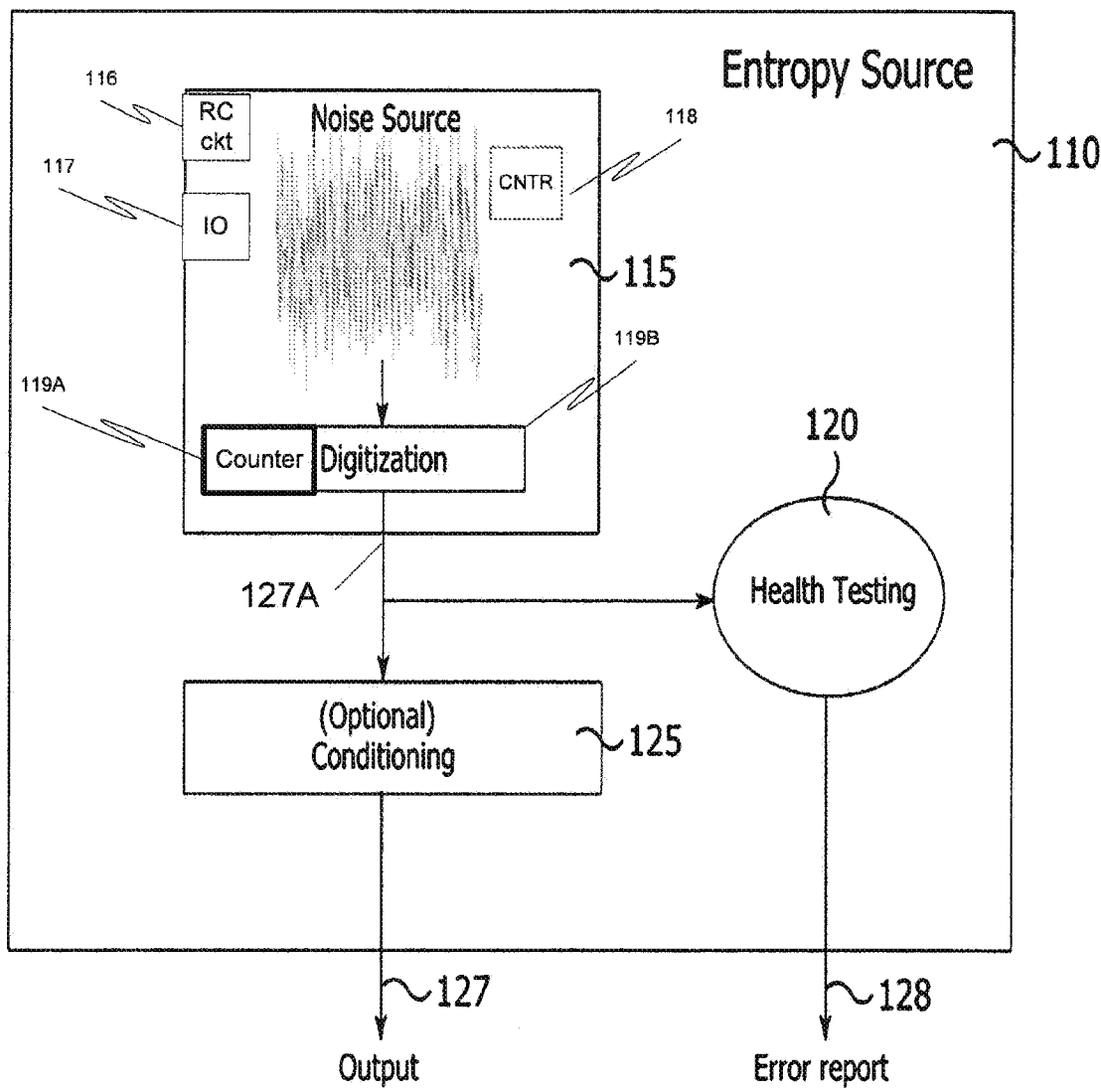
FIG. 1 illustrates an entropy source in accordance with an embodiment of the present invention.

FIG. 1 is an entropy source 110 having a noise source 115. The entropy source 110 extracts entropy from noise inherent in the sampling of an RC circuit 116. The entropy source may be implemented in a semiconductor device, such as an Application Specific Integrated Circuit (ASIC) or FPGA. The RC circuit 116 may be implemented using external resistors and an external capacitor, although in principle the entire RC circuit could be integrated into an ASIC. A controller 118 controls the operation of the I/O circuit 117 to periodically charge and discharge the capacitor of the RC circuit 116.

In one embodiment, the I/O buffer circuit 117 permits the periodic charging of a capacitor through a current limiting resistor and allows for discharging through a discharge resistor, with the timing of these operations determined by a controller 118. During a discharge phase, a time varying decaying voltage from the capacitor of the RC circuit is used as the input of the I/O buffer circuit 117. This results in the generation of an output of the I/O buffer circuit that is a digital logic signal which in turn is used to enable and disable a counter 119. The counter 119 is clocked by a high speed clock. Additional digitization electronics 119B may also be included to convert the count value of the counter 119A into a bitstring representative of entropy. As one example, a four bit entropy bitstring may be generated in each period with which the capacitor is discharged. The decay time constant of the RC circuit is selected to be much longer than an individual clock period of the high speed clock. Thus, the voltage value at the capacitor may be sampled over multiple clock cycles of the high speed clock. In one embodiment, the counter 119A is reset when the capacitor is fully charged and its value is sampled after the capacitor has been discharged to provide a random counter value for every charge/discharge cycle.

The random counter value is each charge/discharge period and is used to generate a digital value providing an value 127A indicative of entropy, which may be optionally further conditioned 125 to generate an entropy value 127.

In one embodiment, the health testing 120 is performed and an error report generated 128 A health check may, for example, include checking to ensure that the count value is changing and that the count value is incrementing at a sufficient rate to 'wrap round' (which is to say the counter reaches it maximum value and then on the next clock cycle when it increments it returns to its minimum value or zero) several times during the discharge period. Additionally, other checks may be performed to ensure that the capacitor and the resistors are operating properly and that there are no open or short circuits.

Figure 2A:
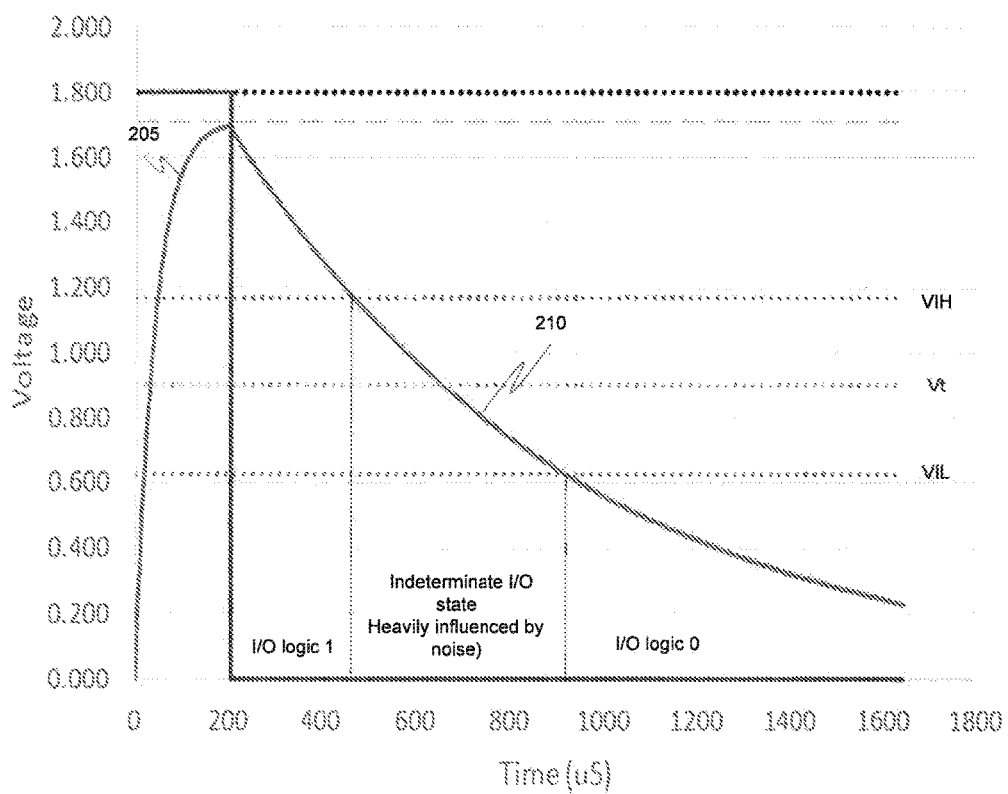
FIG. 2A illustrates a charging phase and a discharging phase of the RC circuit in accordance with an embodiment of the present invention.

FIG. 2A illustrates a non-limiting example of the voltage at the capacitor for one period of a charge/discharge cycle. In this example the voltage rises during a charge cycle 205 and is discharged in a discharge cycle 210. In this example of FIG. 2A, the capacitor is charged for 200 microseconds in a charging phase and then discharged for 1400 microseconds in a discharging phase. The cycle then repeats. An I/O cell is employed which is set to have no built-in hysteresis (e.g., Schmitt trigger) function, such that when the voltage input from the capacitor lies in an intermediate region between the VIH and VIL transition voltages of the I/O cell, the digital logic output will be indeterminate/unpredictable, due to both the transition characteristics of the I/O cell itself, noise at its input (on the capacitor voltage) as well as noise on the ground and power supply lines to the I/O cell.

Figure 2B:
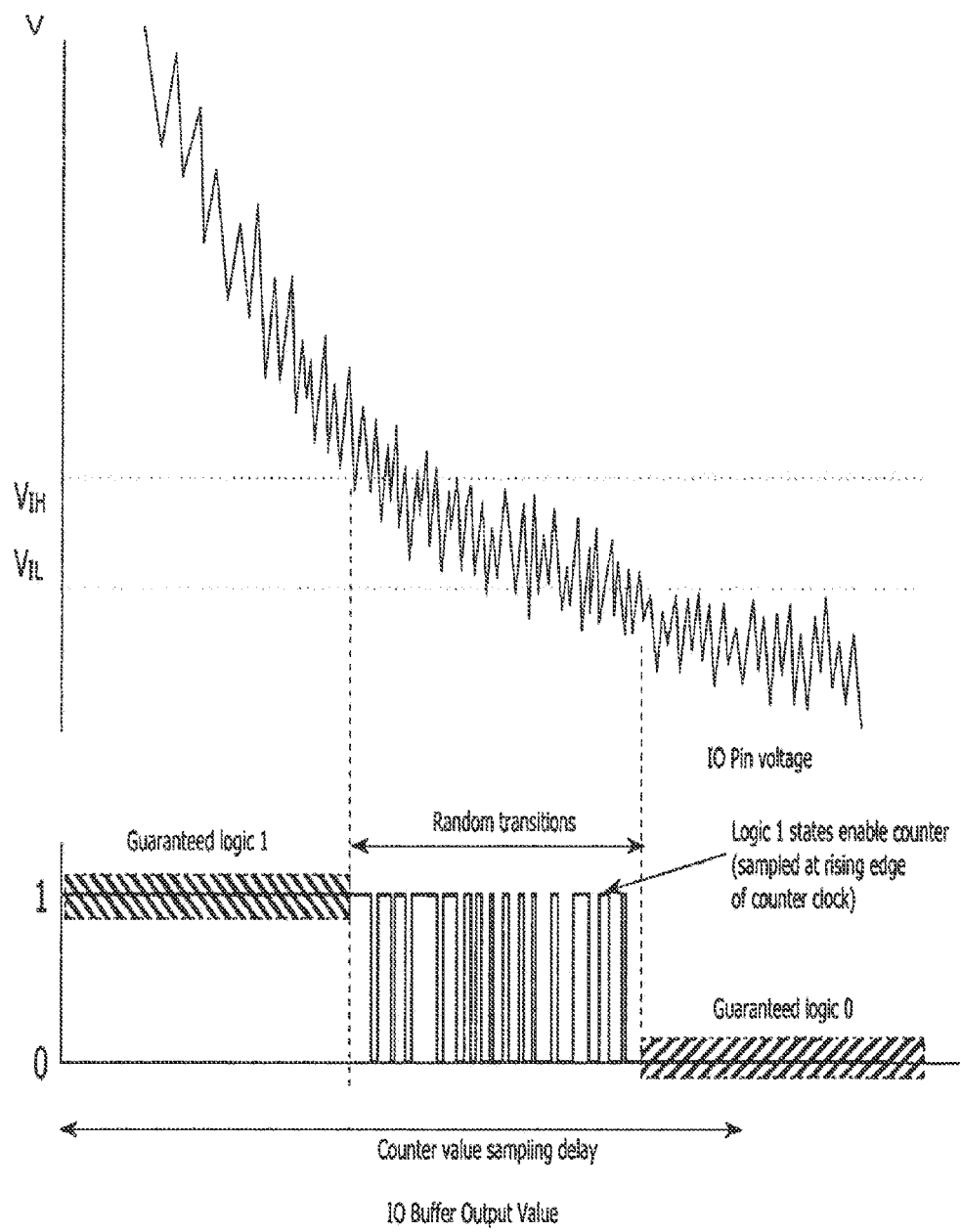
FIG. 2B illustrates the generation of random transitions in a discharge phase in accordance with an embodiment of the present invention.

FIG. 2B illustrates the discharge phase in more detail with the noise exaggerated for the purposes of illustration. As the capacitor voltage decays in the discharge phase, it will initially be high enough to guarantee that the I/O will have some initial value, such as a digital 1. After the voltage decays enough, the voltage will become sufficiently low as to guarantee the opposite value, such as digital 0. In between, there will be a region in which the transitions are random due to the transfer characteristics of the buffer.

The transfer function between input voltage and output logic state of an I/O cell buffer is a curve with an inflexion point rather than a step function. There are two thresholds defined: the VIL threshold which is the maximum input voltage at which the I/O cell buffer output will be guaranteed to be considered a logic 0, and the VIH threshold which is the minimum input voltage at which the I/O cell buffer output will be guaranteed to be considered a logic 1. Between these 2 voltages there is a transition region where the output logic state will be indeterminate and could be considered a 0 or a 1.

As the capacitor discharges, the output voltage falls from the nominal maximum voltage, Vccio, to 0V. As the voltage transitions through the region separating the high and low I/O voltage thresholds of the I/O cell, the sampled value is non-deterministic and heavily influenced by noise in the system. An input voltage which 'hovers' between the thresholds result in an output logic state which randomly and continually switches back and forth between 1 and 0.

In practice there are various noise sources, which while small, also provide an additional mechanism for random transitions. Consider the case of an external capacitor. There will be some amount of random noise and transient voltages present on the I/O pin. The level of this noise may be quite small (perhaps 25 mV in some cases). However, the combination of maintaining the input voltage in the intermediate range and any noise will generate random transitions that can be counted and used as an entropy source.

As illustrated in FIG. 2B, the value of the RC decay time constant and the high speed clock frequency may be selected in combination with other values to sample a substantial number of random transitions in each period. In implementing an entropy source, another aspect that can be utilized is selecting design parameters so that the counter wraps around to further facilitate randomization. In one embodiment, the resistor and capacitor values of the circuit connected to the I/O cell input are chosen so that the decay period will result in an input voltage at the I/O cell which spends a sufficient time between the VIH and VIL transition voltage of the cell for the counter driven by the high speed clock to have been enabled enough times for it to have 'wrapped round' (where the counter gets to its maximum value then on the next increment goes back to zero to start counting afresh) several times before the value is eventually sampled.

As an illustrative but non-limiting example, the clock may be fast enough with respect to the decay rate that hundreds or even thousands of random transitions may be counted in each period of the periodically decaying voltage. Additionally, the design parameter may be selected to ensure a minimum number of times that the counter wraps around.

As illustrated in FIG. 2B, a delay may be included to delay determining a final value of the counter until after all of the random transitions have completed. This may be based on time or by verifying that the counter is no longer changing.

Figure 3:
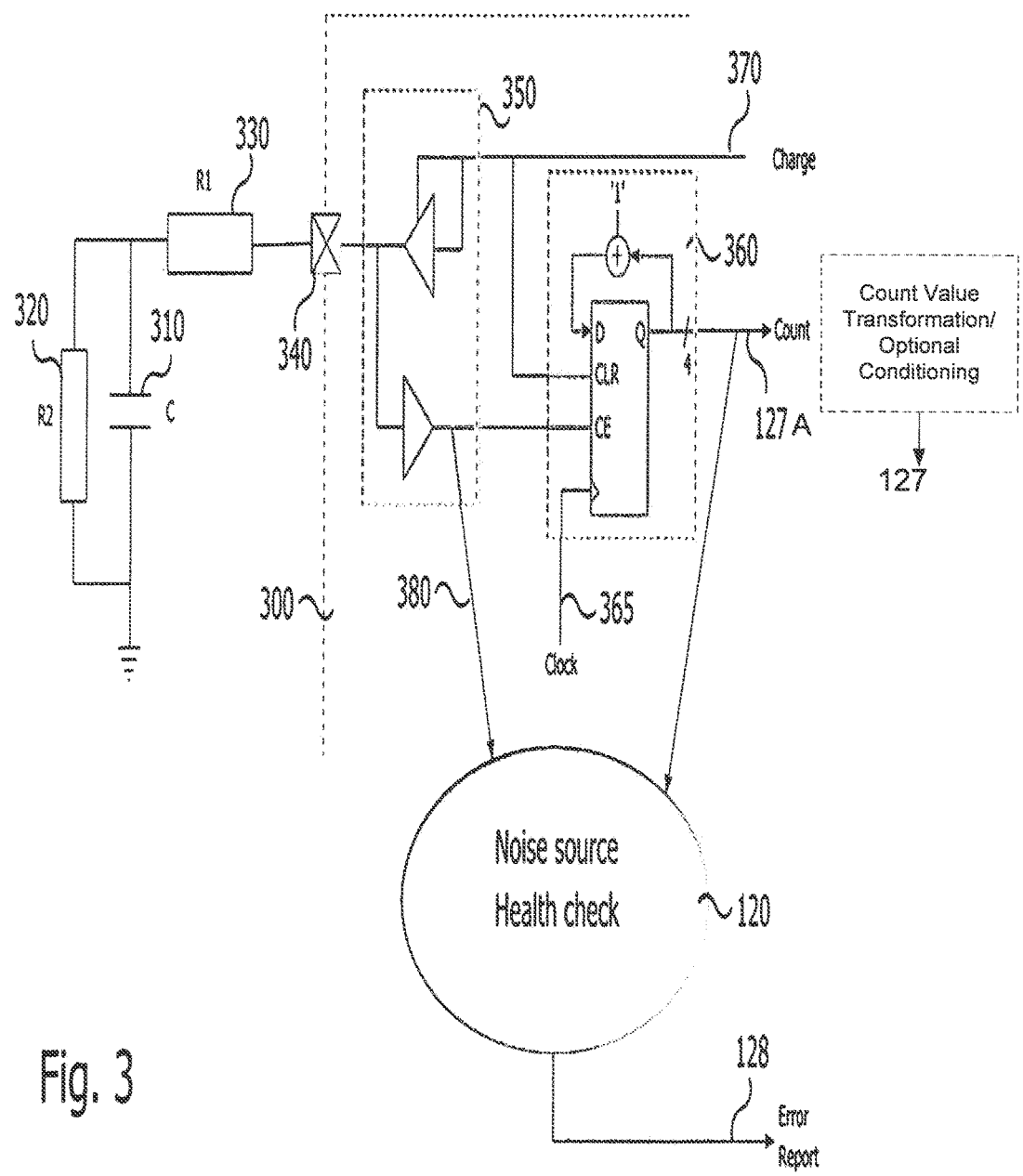
FIG. 3 illustrates an example of a circuit to provide an entropy source in accordance with an embodiment of the present invention.

FIG. 3 shows a representative circuit diagram of one embodiment of the invention. A semiconductor device 300 has a general purpose I/O pin 340 which is connected via a resistor 330 to a capacitor 310 and resistor 320 in parallel, with the other end of the parallel connection connected to ground. The I/O pin 340 is connected within the semiconductor device 300 to an I/O cell 350. The I/O pin 340 voltage will be driven to Vccio for a logic high and 0 V for a logic low. Vccio will vary according to the I/O cell technology used, but could be 1.8V, 3.3V or 5V etc.

A charge signal 370 drives the output buffer of the I/O cell and is connected to the CLR (Clear) line of a counter 360. The input buffer of the I/O cell drives the CE (Clock Enable) line of the counter 360. The counter output Q is fed back to the data input D of the counter 360 via an adder which adds a '1' to the count. The count value 127A forms the basic output of an entropy value 127 if the optional entropy conditioning does not take place. Additionally, it will be understood that the count value 127A may undergo a mathematical transformation, such as taking a subset of bits of the count value 127A. Thus, while in some cases the count value 127A may be directly used as an output entropy value 127, more generally it may be mathematically manipulated or further conditioned to generate an entropy value 127.

In one embodiment a normal mode of operation is as follows:
1. In the initial state, the capacitor 310 will have discharged through resistor R2 320 and the capacitor voltage and the I/O pin 340 voltage will be at ground potential.
2. The charge signal 370 is driven high which clears the counter 360 and enables the output buffer of the I/O cell 350, driving the I/O pin 340 to Vccio.
3. The voltage on the capacitor 310 will rise to a potential R2/(R1+R2)*Vccio after the charge signal 370 has been held high for a minimum period of Vccio*R1*C.
4. The charge signal 370 is taken low, which removes the clear on the counter 360 and disables the output buffer of the I/O cell 350.
5. The capacitor 310 has been charged to almost Vccio and the output of the I/O cell 350 input buffer is a logic high, enabling the counter 360 which increments on each cycle of the high speed clock 365
6. The capacitor 310 discharges through the resistor R2 370 and the voltage at the I/O pin 340 slowly drops towards 0V.
7. As the I/O pin 340 voltage passes through the transition region between VIH and VIL of the I/O cell 350, the buffer output 380 will randomly switch between logic low and logic high. During the logic low periods, the counter 360 will not increment on each high speed clock 365 cycle.
8. After a period of two time constants 2*R2*C (where the I/O pin 340 voltage will have dropped to 14% of Vccio, well below any VIL threshold voltage, such that the clock 360 CE enable input will be permanently low and the Clock 360 will stop incrementing), the Count value 127A is sampled.

Health checks on the noise source 120 may be conducted to detect abnormal operating conditions by sampling the raw digital output 380 from the I/O cell input buffer and the count value 127A. The digital output 380 can be used to detect component failure type faults in the external resistor/capacitor circuit.

The entropy source has very few components and is likely to be highly reliable. However, various health checks that may be performed on the RC circuit. If resistor R1 goes high resistance or open circuit, the output 380 that the input buffer returns will remain the same before and after a charging cycle, as the I/O pin 340 will be floating and most likely give a continuous logic 1 at the I/O input buffer output 380. If R2 320 goes high resistance or open circuit, then when the charging cycle period has completed, the voltage at the I/O pin 340 will remain high for a very long time (which will approximately be of at least an order of magnitude greater than the normal condition discharge time) as the capacitor 310 can only discharge through R1 330 and the input impedance of the I/O cell 350, which will be very high. Thus, after charging has completed, the output 380 will remain a logic high for a very long time. If R2 370 or the capacitor 310 go short circuit, the voltage at the I/O pin 340 will be tied to ground and the charging cycle will have no effect with no charge voltage on the capacitor 310. The output 380 will remain at logic 0 before and after a charging cycle in this case.

Health checks 120 may also be made on the 4 bit count value 127A, by sampling it at periods which are some small (<16) multiple of the high speed clock 365 period, to ensure that the count value is changing. A health check can also be made by having an alternative counting mode whereby the counter 360 is held cleared until the first time that the input buffer's output 380 goes low. Then the transitions to logic high by output 380 cause the counter to be incremented until finally the I/O pin 340 voltage drops below VIL and the counter stops. The final count 127A in this check will depend on the number of (random) transitions made by output 380. This health check is repeated several times, where the individual end result counts should be all different (within some statistical confidence limit) This ensures that the I/O cell 350 voltage is spending some appreciable time in the transition voltage region, VIH to VIL, of the I/O cell 350 input buffer in order to cause a number of random transitions.

The circuit of FIG. 3 can be implemented in different ways. In one embodiment, an external capacitor is used and other circuit components are implemented on an ASIC. For example, a single digital ASIC I/O may be used to periodically charge an external capacitor through a current limiting series resistor, and then allow it to discharge via a parallel discharge resistor. Alternatively, the capacitor may be implemented on the same ASIC as other circuit components.

An exemplary methodology to select a set of component values includes:
1. Selecting R1 to limit the peak current of the I/O to below its maximum drive strength (i.e. Vccio/R1<Imax).
2. Selecting R2 to be >>R1 such that the voltage at the capacitor, C, is charged is close to the I/O voltage Vccio.
3. Selecting the discharge time constant (C*R2) to allow for a 4-bit counter to wrap many times (preferably several thousand) such that the final value contains sufficient entropy (as assessed by statistical analysis). In particular, the values may be selected for the entropy to be compliant with the requirements of industry standards such as those specified by NIST SP 800-90A, NIST SP 800-90B. The frequency of the clock is therefore important in determining the component values.
4. Selecting a lower bound of the period with which samples can be obtained by setting the sum of a charge time and a discharge time: (5*R1*C)+(2*C*R2). This selection must satisfy the maximum entropy generation rate requirement of the system.

If the discharge time constant of the RC circuit is set such that the drift through VIH to VIL takes several thousand cycles of the digital counter clock, significant entropy can be extracted from the low order bits of the count value, sampled at the first time the I/O is observed to be a logic zero.

In one embodiment, the counter counts all the cycles where the digital input is sampled as 1 at the point of the rising edge of the counter clock. The counter wraps back to zero following its maximum count value.

In one embodiment, extraction of a single count sample is achieved as follows:
1. Assert "charge" (drive the I/O to a logic '1') for at least 5*C*R1 to guarantee the voltage on the cap is around 99% of Vcc, and therefore well above VIH.
2. De-assert "charge" (remove I/O drive), allowing C to discharge through R2.
3. Wait for at-least 2*C*R2 to ensure C has discharged to well below the VIL threshold of the I/O buffer.
4. Read the "sample" output value of the counter.

In one embodiment, the counter is set to count all the clock cycles where the I/O cell buffer output is sampled at a value of 1, during both the initial region of guaranteed logic 1 and the region of uncertainty where there will be random transitions. Finally, after a delay which is known to be a clear period after the random transitions have ceased, the value of the counter is sampled and this value used as a sample of entropy.

A result of this is that, even if the capacitor is always charged to the same precise voltage and the value of the capacitor and resistances do not vary (in which case the nominal voltage discharge voltage curve against time will not vary), the effect of random noise on the I/O pin 340 and the non-linear input to output transfer characteristics of the I/O cell 350 with an indeterminate region, plus the asynchronous nature of the counter sampling clock with respect to the I/O cell buffer output transitions, means that the counter value reached by the end of the capacitor discharger period will still contain entropy.

Experimental tests were performed for the circuit of FIG. 3. Component values were selected as follows. The purpose of resistor R1 is to limit the maximum charging current drawn from the I/O cell 350 during the charge cycle 370. To set a practical limit of 1 mA, the value of R1 was selected to be equal to the IO voltage in mV, so 1.8K Ohm for a 1.8V I/O. The purpose of R2 is to define the discharge time constant of the circuit. In one embodiment charging is performed for three time constants, which is sufficient to guaranteed that the voltage is above VIH as long as R2 is at least equal to 3×R1. In addition, because R1 and R2 form a potential divider, R2 must be at least 2×R1, to ensure C can charge to >VIH (typically around 66% VCCIO). A recommended minimum value is 5 to 10 times the value of R1.

Once R1 and R2 are chosen, C defines the discharge time constant (R2*C) and C should be chosen such that the discharge time is several orders of magnitude (at least 4) larger than the period of the counter clock. For example if the counter is clocked at 100 MHz, a period of 10 ns, the discharge time should be at least 100 us. The longer the discharge time constant, the better chance of a significant amount of entropy in the output. However, the charge and discharge time constants also determine the maximum entropy rate of the circuit. Assuming a full 4-bits of entropy (maximum) per 4-bit sample, the maximum entropy rate of the circuit is 4/(tCharge+tDischarge) bits per second. So the choice of C is a tradeoff between output rate and output quality, and will need to be tuned for a particular implementation.

An example set of component values satisfying these requirements is R1=1.8 k ohms, R2=33 k Ohms, C=22 nF, VCCIO=1.8V, and a clock speed of 50 MHz In this example the charge time is 3*R1*C and the discharge time=1*R2*C. This gives 361807 clocks to discharge to VIL and a maximum entropy rate of 4.7 kbps An experimental trial indicated that the NIST SP 800-90B Independent and Identically Distributed (IID) tests were passed. Passing the IID test demonstrates that embodiments of the present invention can function as NIST SP 800-90B compliant entropy sources for use in DBRGs and cryptographic modules, including the DBRG specified by NIST 800-90A. As the FIPS 140-2 standard specifies that NIST approved cryptographic functions must be used, it will thus be understood that one application of the entropy source of the present invention is for use in FIPS 140-2 cryptographic modules.

Applications of the present invention thus include entropy sources satisfying NIST 800 90-B, DBRGs using the entropy source in accordance with NIST 800-90A, and FIPS 140-2 (level 2) standard) compliant cryptographic modules. As previously discussed, these may be implemented as an integrated circuit utilizing an external RC circuit or as a fully integrated solution utilizing including an internal RC circuit within an integrated circuit.

Figure 4:
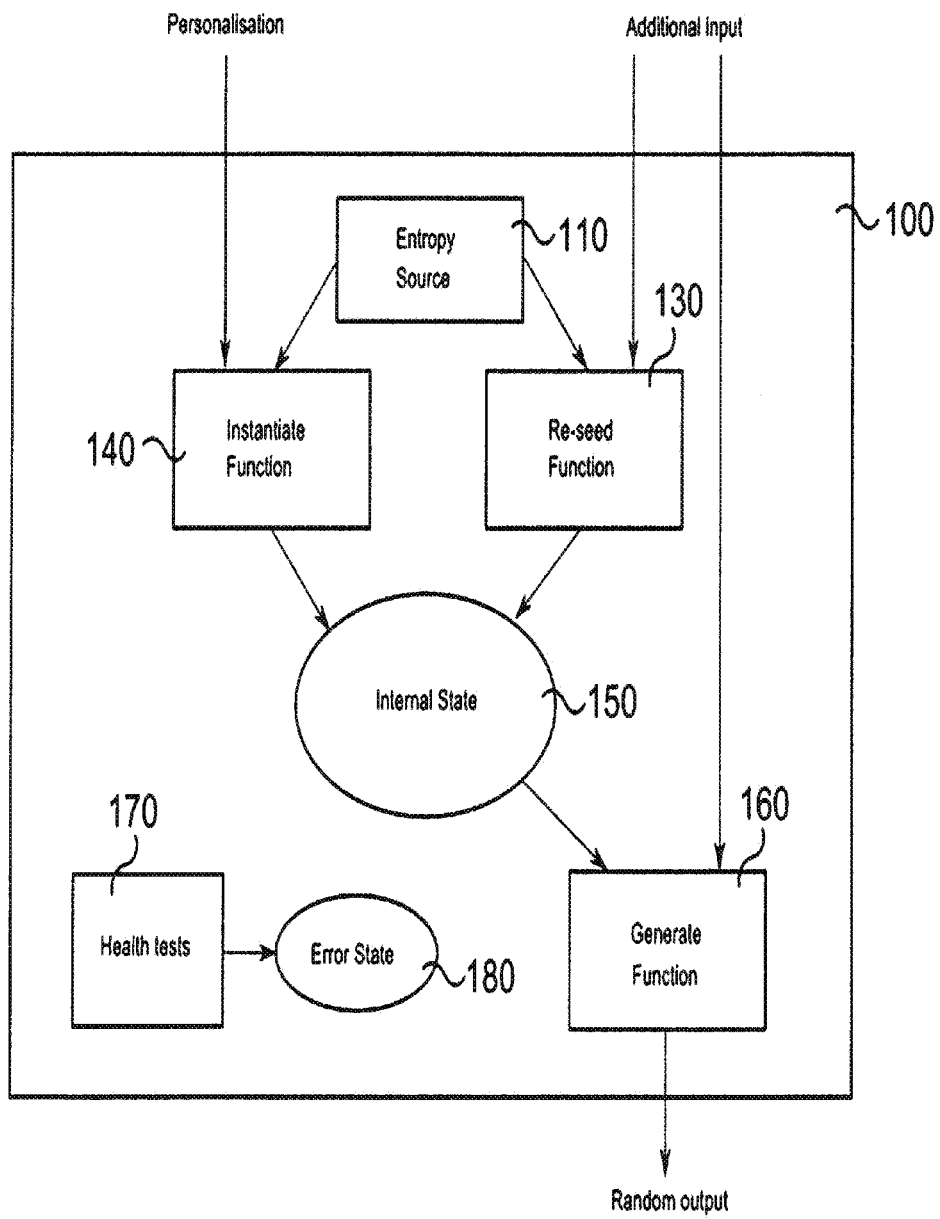
FIG. 4 illustrates a DBRG utilizing the entropy source in accordance with an embodiment of the present invention.

FIG. 4 illustrates a Deterministic Random Bit Generators (DRBGs) which will function as CSPRNG based on the entropy source of FIG. 1. That is, one application of the entropy source of the present invention is to generate the seed of a DRBG, which is compliant with NIST 800-90A. The entropy source 110 provides an output used by an instantiate function 140 and a re-seed function 130. These are used to generate an internal state 150. A generate function 160 generates the random output. Additional health tests 170 and error state detection 180 are performed.

Figure 5:
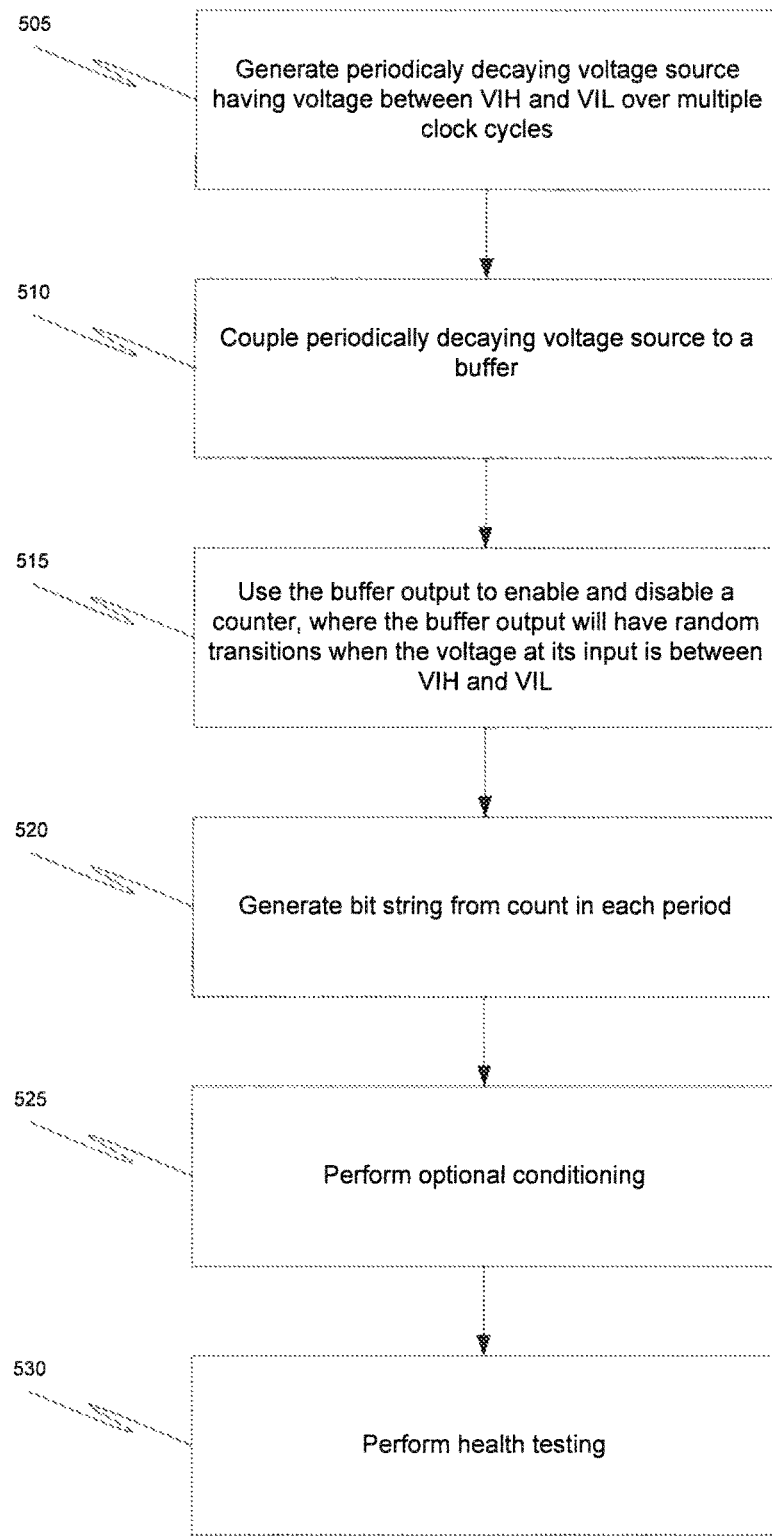
FIG. 5 illustrates a method in accordance with an embodiment of the present invention.

FIG. 5 illustrates a general method in accordance with an embodiment of the present invention. A capacitor circuit that is periodically charged and discharged via an RC circuit having RC decay time constant is one option 505 to generate a periodically decaying voltage. This periodically decaying voltage is coupled to an input of an I/O buffer of a counter circuit 510. In each period random transitions of the I/O buffer output enables and disables a counter 515 and a bit string is generated 520, such as a four bit string. Optional conditioning may be performed 525. Health testing may also be performed 530 to monitor the health of the entropy source and generate an error report.

It will be understood that the random transitions in the output of the buffer circuit may be used to generate an entropy source in other ways than those illustrated in FIG. 3. As previously discussed, in one embodiment the output of the buffer (with random transitions) is used to enable/disable the clock circuit in the counter. However, more generally, it is possible to use an output of a buffer to directly drive a clock circuit and count the number of random transitions. It is believed likely that using the output of the buffer to enable/disable the clock circuit of the counter provides more entropy than directly counting the transitions. However, in principle the transitions may be directed counted, which may be acceptable in some applications.

While an RC circuit is one example of a circuit that may be used to generate a decaying voltage function it will be understood that other circuits could be used to generate a decaying voltage function. An RC circuit is a comparatively simple circuit to generate a decaying voltage between VIH and VIL. However, it will be understood that circuits providing an analogous decaying voltage function could be utilized.

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention. In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

What is claimed is:

1. A method of forming an entropy source, comprising:
    charging and discharging a capacitor of an RC circuit with an RC decay time constant period greater than a clock period of a clock;
    sampling, at intervals of the clock period of the clock, a voltage of an output of an I/O buffer with the RC circuit received in an input of the I/O buffer during a discharge phase when the voltage decays from a maximum value to a minimum value; and
    using random transitions in the output of the I/O buffer to extract entropy from noise associated with the sampling of the RC circuit.

2. The method of claim 1, wherein using random transitions comprises using the output of the I/O buffer when the voltage is within an indeterminate region of a transfer function of the I/O buffer.

3. The method of claim 2, wherein the indeterminate region corresponds to a voltage between VIH and VIL, where VIH is a minimum voltage to generate a logical 1 and VIL is a maximum voltage to generate a logical zero.

4. The method of claim 2, wherein using random transitions includes enabling and disabling a counter clocked by the clock and the RC decay time constant for the voltage to be discharged is selected in combination with the clock period of the clock to ensure that the value of the counter is wrapped round a plurality of times.

5. The method of claim 4, wherein the value of the counter is used to generate a four bit entropy value.

6. The method of claim 4, further comprising performing a health check of the RC circuit and the counter.

7. The method of claim 2, wherein using random transitions includes enabling and disabling the counter clocked by the clock and the RC decay time constant for the voltage to be discharged is selected in combination with the clock period of the clock to ensure that at least thousands of random transitions are generated during each discharge phase.

8. The method of claim 2, wherein using random transitions includes counting random transitions in the output of the I/O buffer.

9. The method of claim 1, further comprising utilizing the entropy source to generate a seed value in a Deterministic Random Bit Generator.

10. A Cryptographically secure Deterministic Random Bit Generator (DRBG) apparatus, comprising:
    an entropy source including:
        an RC circuit;
        an input/output buffer circuit having an input monitoring a voltage of the RC circuit;
        a controller to periodically charge and discharge a capacitor of the RC circuit with a period greater than a period associated with a clock; and
        a digitization circuit including a counter clocked by the clock to sample, at intervals of the clock period of the clock, the output of the input/output buffer circuit and use a sequence of random transitions of the input/output buffer circuit output in each discharge phase when the voltage is in an indeterminate voltage range of the input/output buffer circuit to enable and disable the counter and generate an entropy value bitstring being the value of the counter;
    wherein the entropy source is utilized to provide an entropy input to generate a seed of the DRBG.

11. The apparatus of claim 10, wherein the entropy source is compliant with the NIST SP 800-90B standard.

12. The apparatus of claim 10, wherein the DRBG is compliant with the FIPS 140-2 standard.

13. The apparatus of claim 10, wherein the entropy source produces an entropy output that is independent and identically distributed.

14. An entropy source apparatus, comprising:
    a noise source including:
        a voltage circuit generating a periodically decaying voltage function;
        a buffer circuit having a transfer function with an indeterminate output in an intermediate voltage region, the buffer circuit having an input monitoring the periodically decaying voltage function and an output received by a digitization circuit;
    wherein the digitization circuit uses random transitions in the output of the buffer when the periodically decaying voltage function is in the intermediate voltage region and the digitization circuit generates an entropy output based on the random transitions.

15. The apparatus of claim 14, wherein the digitization circuit comprises a counter enabled and disabled by the random transitions.

16. The apparatus of claim 14, wherein the voltage circuit comprises a circuit having a capacitor, at least one resistor to control a charging characteristics, and at least one resistor to control discharging characteristics.

17. The apparatus of claim 14, further comprising a health test unit to check the health of the noise source.

18. The apparatus of claim 14, wherein the digitization circuit comprises a counter counting the random transitions.

19. A method of forming an entropy source, comprising:
sampling a decaying voltage of an resistor-capacitor circuit using a buffer circuit having a transfer function in which an indeterminate output is generated when an input voltage is in an intermediate range between VIH and VIL, where VIH is a minimum voltage to detect a logical 1 and VIL is a maximum voltage to detect a logical 0; and
using random transitions from the buffer circuit output when the decaying voltage is not guaranteed to be above VIH or below VIL to generate at least one entropy value.

20. The method of claim 19, wherein the decaying voltage is periodically generated with a period greater than a period of a sampling clock and the method further comprises selecting a decay time constant and a sampling clock rate such that at least thousands of random transition occur in each period of the decaying voltage.

21. A method of forming an entropy source, comprising:
inputting a periodically decaying voltage waveform of an RC circuit to an input of a buffer;
generating random transitions from the input waveform in a first period and a second period of a clock, wherein the input waveform is selected to a have a voltage in the first period in an intermediate transition region over multiple clock cycles; and
using the random transitions to enable and disable a counter circuit driven by the clock in the first period.

22. The method of claim 21, wherein the intermediate transition region is a region between a minimum voltage interpreted as a guaranteed digital 1 by the buffer and a maximum voltage interpreted as a guaranteed digital 0 by the buffer.

23. The method of claim 21, further comprising utilizing an output value of the counter circuit in each period as a source of entropy.

24. The method of claim 21, wherein the periodically decaying voltage waveform includes a noise component.

25. The method of claim 21, further comprising performing a health check on the RC circuit and the counter circuit.

* * * * *